US006978970B2

(12) United States Patent
Purcell, Jr.

(10) Patent No.: US 6,978,970 B2
(45) Date of Patent: Dec. 27, 2005

(54) AIRCRAFT WITH FOLDABLE TAIL ASSEMBLY

(76) Inventor: Thomas H. Purcell, Jr., 208 Carolina Meadows Villa, Chapel Hill, NC (US) 27517-8500

( * ) Notice: Subject to any disclaimer, the term of this patent is extended or adjusted under 35 U.S.C. 154(b) by 0 days.

(21) Appl. No.: 10/833,657

(22) Filed: Apr. 28, 2004

(65) Prior Publication Data
US 2005/0242236 A1 Nov. 3, 2005

(51) Int. Cl.[7] ............................. B64C 5/12
(52) U.S. Cl. ............... 244/49; 244/7 R; 244/87
(58) Field of Search .................. 244/7 R, 49, 87, 244/327, 12.6, 45 R, 2

(56) References Cited

U.S. PATENT DOCUMENTS

| 3,026,065 | A | * | 3/1962 | Holland, Jr. ............. 244/12.4 |
| 3,083,936 | A | * | 4/1963 | Rethorst ................. 244/49 |
| 3,614,032 | A | | 10/1971 | Purcell |
| D277,116 | S | * | 1/1985 | Johnston ................ D21/451 |
| 4,881,701 | A | * | 11/1989 | Bullard ................. 244/49 |
| 4,962,978 | A | | 10/1990 | Weston |
| 5,154,370 | A | | 10/1992 | Cox et al. |
| 5,582,364 | A | | 12/1996 | Trulin et al. |
| 5,836,541 | A | * | 11/1998 | Pham .................... 244/2 |
| 6,086,014 | A | * | 7/2000 | Bragg, Jr. ............... 244/2 |
| 2003/0094536 | A1 | * | 5/2003 | LaBiche ................ 244/2 |

OTHER PUBLICATIONS

Fulghum, David A. "Small and Wired: Big Expensive Recon Projects Are Expected to Give Way to Small, Cheap Alternatives". Aviation Week & Space Technology; Mar. 15, 2004; p. 35.
Janes All the World's Aircraft Encyclopedia, 1989 "Aerocar Mini-Imp".
Applicant's "Sketch of Existing Aircraft with an Inverted V Tail"; 2004.

* cited by examiner

Primary Examiner—Michael J. Carone
Assistant Examiner—Gabriel S. Sukman
(74) Attorney, Agent, or Firm—Richard S. Faust

(57) ABSTRACT

A foldable tail assembly for an aircraft includes a stabilizer and a pair of right and left fins mounted with respect to the stabilizer so that the fins may lay flat over the stabilizer during periods when the aircraft is not flight-ready, and so that the fins may be erected above the stabilizer to form a triangular configuration when the aircraft is ready to fly.

18 Claims, 7 Drawing Sheets

Wings partially open configuration

Fig. 1  Folded configuration

Fig. 2  Wings partially open configuration

Fig. 3  Ready to Fly configuration

AIRCRAFT WITH FOLDABLE TAIL ASSEMBLY

FIELD OF THE INVENTION

The invention relates to aircraft and, particularly, to tail assemblies for aircraft. In certain embodiments, the invention relates to aircraft having a tail assembly that folds flat when the aircraft is being trailered for transportation, and thereafter can be erected into an operable tail of triangular configuration for flight.

BACKGROUND OF THE INVENTION

Recent years have seen the proliferation of aircraft that can be transported from a storage site to an airport, lake or other location for flight. It is desirable that these aircraft be configured into a compact package for transport. More particularly, it is desirable that the aircraft, when transported, especially when transported by road trailering, be immune from large wind gusts from passing traffic or strong crosswinds encountered on the road. One particular problem has been that the fixed fins of various tail assemblies have presented substantial exposed panels that cause the trailered aircraft to be buffeted by winds during trailering.

Thus, there is a need for a more compact package for aircraft that are being transported, especially with respect to the tail assemblies. These compact packages, particularly ones that reduce tail height, have the added benefit of reducing storage space for the aircraft between flights.

SUMMARY OF THE INVENTION

The present invention provides a simple, lightweight tail assembly design that folds to a compact configuration when the aircraft is not flight ready, for example, during storage and road trailering. The tail assembly can be readily erected for flight.

In one aspect, the present invention may be defined as a foldable tail assembly for an aircraft including a stabilizer, and a pair of right and left fins mounted with respect to the stabilizer so that the fins may lay flat over the stabilizer during periods when the aircraft is not flight-ready, and so that the fins may be erected above the stabilizer to form a triangular configuration when the aircraft is ready to fly. This foldable tail assembly most preferably is used in connection with an aircraft having wings that are selectively positionable in either a retracted position when the aircraft is not flight-ready or an extended position when the aircraft is ready to fly, and wherein the foldable tail assembly is positionable in either its lay-flat or erected position to correspond to the flight-ready positioning of the wings.

The foldable tail assembly may be moved from its lay-flat to erect positions either manually or automatically.

In certain embodiments, the foldable tail assembly includes a horizontal stabilizer with the fins hingedly mounted to the stabilizer. The fins, when erected, may form an isosceles triangle having the portion of the stabilizer between the fin-mounting hinges as the base of the isosceles triangle, and the fins as the equal sides of the isosceles triangle.

The foldable tail assembly includes an elevator hingedly connected to the stabilizer and a rudder hingedly connected to each fin.

In another aspect, the present invention may be described as a foldable tail assembly for an aircraft that includes a horizontal stabilizer, and a pair of right and left fins hingedly mounted with respect to the stabilizer so that the fins may lay flat over the stabilizer during periods when the aircraft is not flight-ready, and so that the fins may be erected above the stabilizer to form a triangular configuration when the aircraft is ready to fly. An elevator is hingedly connected to the stabilizer and a rudder is hingedly connected to each fin.

DETAILED DESCRIPTION OF THE DRAWINGS

Some of the features of the invention having been stated, other features will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
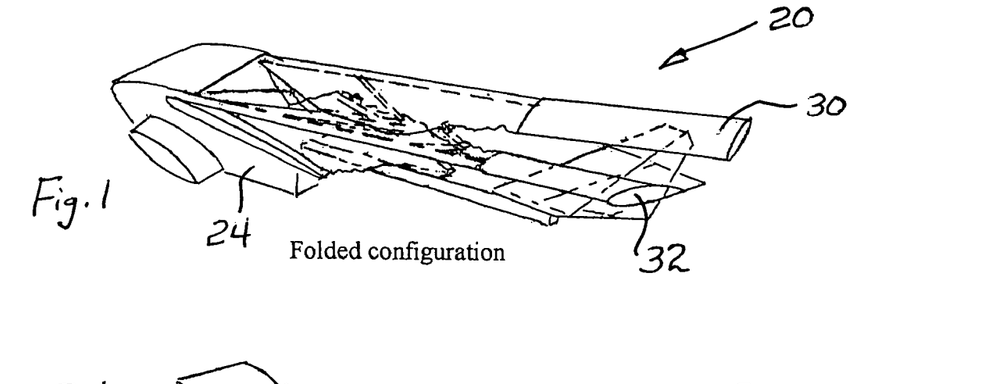
FIG. 1 is a pictorial view of an aircraft in its fully folded configuration for road transportation. Various components of the aircraft are not shown to facilitate illustration.
Figure 3:
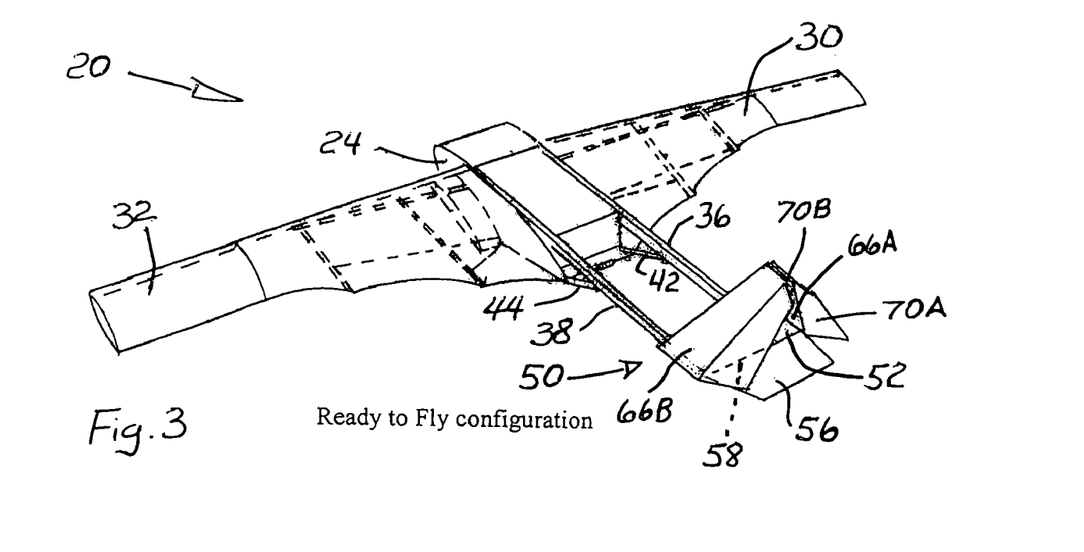
FIG. 3 is a view similar to FIGS. 1 and 2 showing the aircraft in a ready-to-fly configuration with the wings fully opened and the triangular tail assembly fully erected.

Referring to the drawings, there is shown an aircraft 20 of the type that is easy to trailer for road transportation in its fully folded configuration (FIG. 1). After trailering, the wings and tail assembly can be easily opened to a ready-to-fly configuration (FIG. 3). The aircraft may be powered or unpowered.

Figure 2:
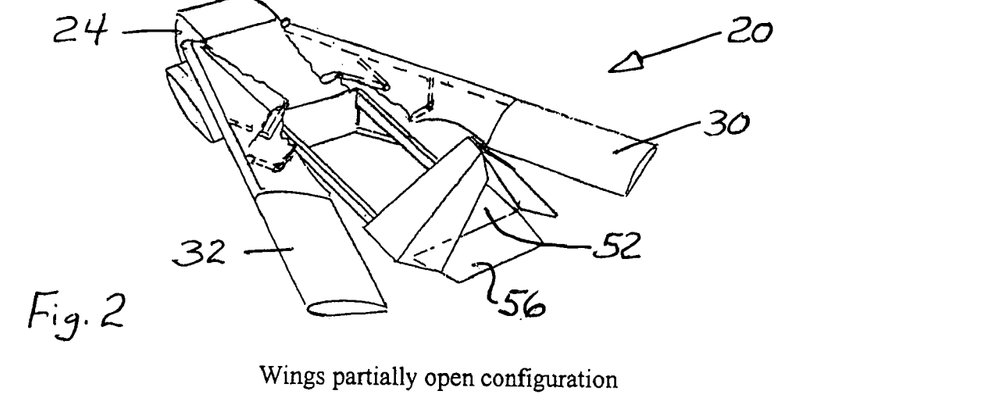
FIG. 2 is a view similar to FIG. 1 showing the aircraft with the wings partially open and the tail fins erected.

Aircraft 20, in the form illustrated in FIGS. 1–3, is a "floatplane" designed for short flights on lakes by recreational pilots, and the present invention will be primarily described herein in connection with this aircraft. It will be appreciated, however, that the invention may be utilized with other forms of aircraft, for example, a land-based aircraft with a normal landing gear, which could be trailered to a convenient airport.

Aircraft 20 includes a fuselage 24. The hull bottom of fuselage 24 preferably is formed of fiberglass-covered Styrofoam. Sufficient Styrofoam is provided to insure floatation in the event of an overturn. The hull may be flat-bottomed, or may have other configurations, such as inverted V shape. The motor, propellor and cockpit are not shown to facilitate illustration.

Aircraft 20 includes suitable folding flexible airfoil wings 30, 32 that furl into compact packages in a folded configuration (FIG. 1) so that no large wing panels are exposed to the battering of wind gusts from passing traffic during trailering. Any suitable foldable wing structure may be employed. In preferred embodiments, the folding flexible airfoil wings take the form of the flex-wings described in applicant's U.S. Pat. No. 3,614,032, the contents of which are incorporated herein by reference in their entirety. The wings, generally constructed in accordance with the teachings of U.S. Pat. No. 3,614,032, are steel cable-reinforced flexible wings that used streamlined sailboat masts for the leading edge spars and high-strength Dacron fabric for the wing covering. Steel overlay cables retain the airfoil shape in the covering, while hinged compression struts maintain the wing contour. The cables are adjusted by small turn buckles (not shown) at the root. Preferably, the wing tips have small, water-ski type bottoms (not shown) to prevent tip dig-in, in case a tip touches the water.

Aircraft 20 includes a pair of front-to-rear extending booms 36, 38 that are structurally connected to fuselage 24 and extend rearwardly to support the tail assembly. Booms 36, 38 are supported, in part, by support members 42, 44 (FIG. 3). While booms 36, 38 are shown as a preferred structure for supporting the tail assembly, other structures may be used, for example, a single boom of larger diameter, or a standard aircraft fuselage frame.

Referring to FIGS. 3–6, tail assembly 50 includes a horizontal stabilizer 52 that is secured to booms 36, 38. Stabilizer 52 is operatively connected to an elevator 56 (FIG. 3) by a conventional hinge mechanism 58. A pair of right and left fin/rudder assemblies, 60A and 60B, respectively, are mounted on horizontal stabilizer 52. Fin/rudder assemblies 60A, 60B, when fully erected for flight, form a triangle atop the stabilizer-elevator assembly. When prepared for road trailering, the fin/rudder assemblies 60A, 60B lie flat, one over the other, to reduce the side forces from side gusts due to passing large vehicles. The lay-flat configuration also reduces the side forces from strong crosswinds on the road.

Figure 4:
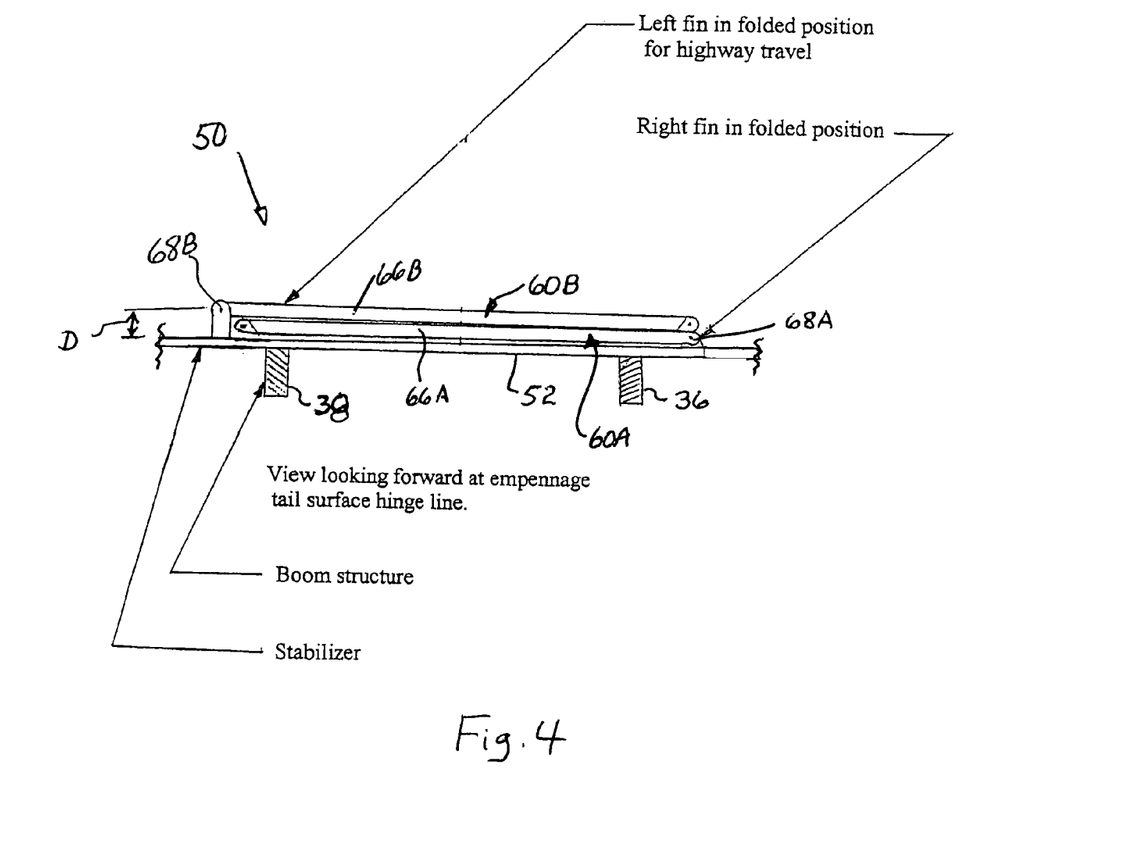
FIG. 4 is an enlarged rear view of the foldable tail assembly in the fully folded configuration shown in FIG. 1. The elevator and rudders are not shown to facilitate illustration.
Figure 5:
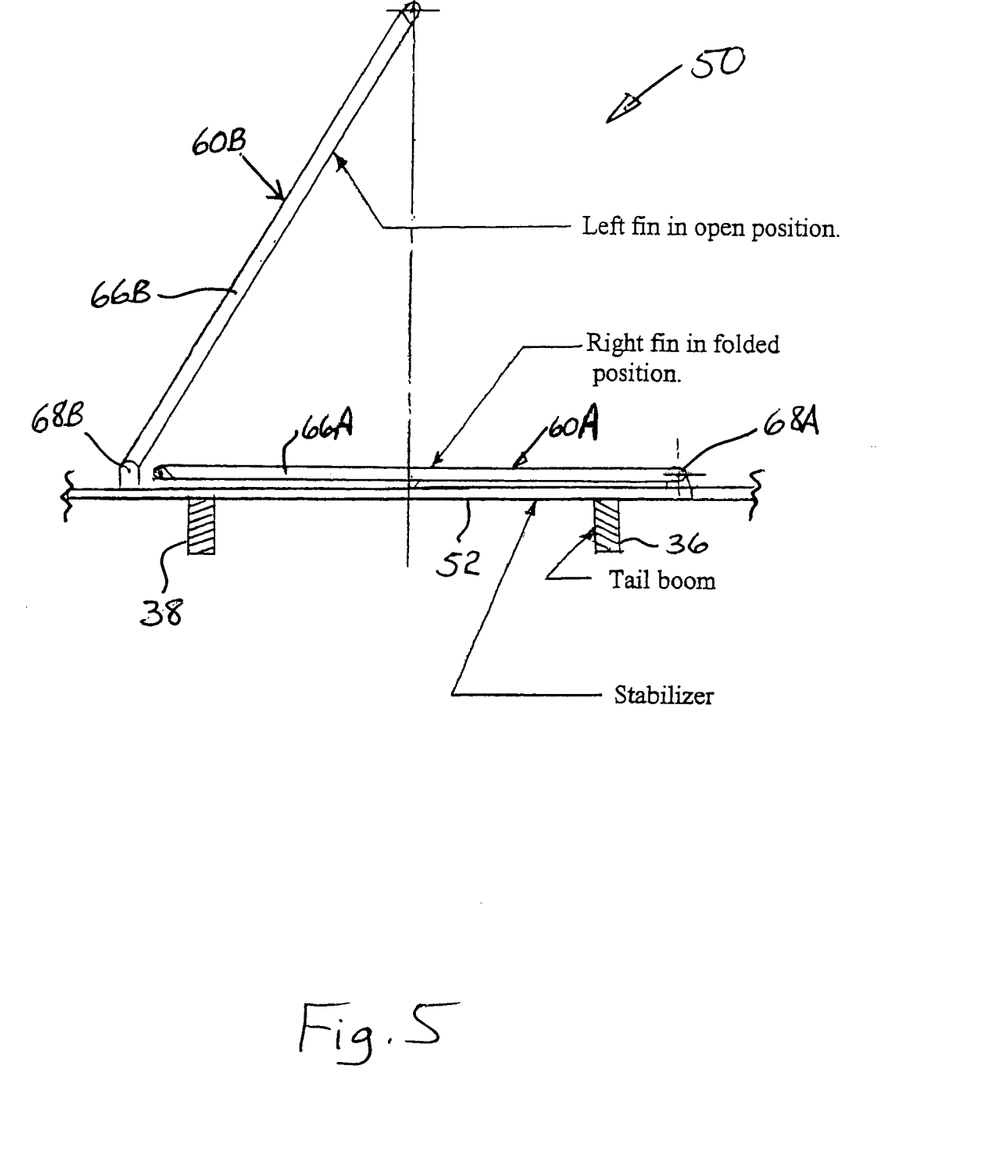
FIG. 5 is a view, similar to FIG. 4, showing the tail assembly partially erected.

A more detailed description of the structure and operation of fin/rudder assemblies 60A, 60B will now be given with primary reference to FIGS. 4–6. Right fin/rudder assembly 60A includes a right fin 66A that is hingedly connected to stabilizer 52 at hinge 68A. Right fin 66A is hingedly connected in conventional manner to a rearward rudder 70A (not shown in FIGS. 4–6, but shown in FIG. 3). Right fin 66A and its connected rudder 70A may lie flat against stabilizer 52 for road trailering (FIG. 1) and may move to the erect position shown in FIGS. 3 and 6 for flight, in a manner described below.

Left fin/rudder assembly 60B includes a left fin 66B that is hingedly connected to stabilizer 52 at hinge 68B. In the embodiment illustrated in FIGS. 4–6, hinge 68B includes a hinge point that is raised above stabilizer 52 by a distance "D" (FIG. 4) that permits left fin 66B to overlay right fin 66A in such a manner that both lay flat when folded for road trailering (FIGS. 1 and 4). Left fin 66B is hingedly connected to a rudder 70B (FIG. 4). Left fin 66B and its connected rudder 70B may lie flat above left fin 66A for road trailering (FIG. 1) and may move to the erect position shown in FIGS. 3 and 6 for flight.

Figure 6:
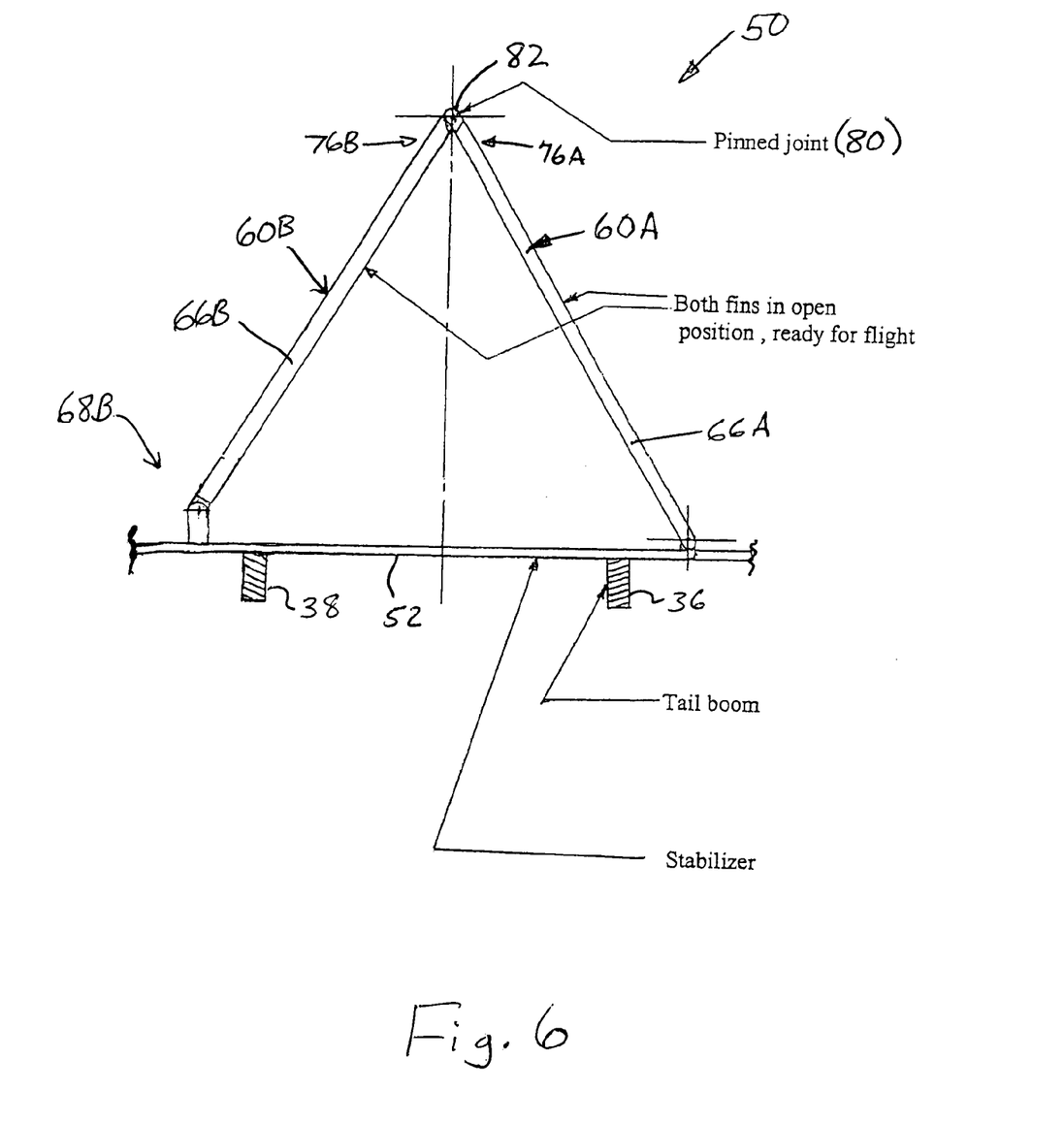
FIG. 6 is a view, similar to FIGS. 4 and 5, showing both right and left fin/rudder assemblies in a raised position and pinned together to form a fully erected triangular tail assembly that is ready for flight.

Fins 66A and 66B include means enabling the fins to be held in place when erected to the ready-to-fly configuration of FIGS. 3 and 6. The means for holding fins 66A, 66B in place may include a cooperative joint structure on the upper ends 76A, 76B of the fins, for example, as shown in FIG. 6, a pinned joint 80 formed by mating openings at fin ends 76A, 76B and an interconnecting quick-latching pin or bolt 82. Other joint structures may be employed, for example, other forms of quick-latching mechanisms where the top ends of the fins join. In this regard, it will be appreciated that the erection of the tail assembly may be manual operation, or it may be performed by an automatic erecting mechanism that lifts the fins and locks them in place. An automatic erecting mechanism may take the form of rotary actuators, e.g., small electric or hydraulic motors, at the fin roots (hinges 68A, 68B), coupled with a remote actuated pin at the top of the assembly, such as a spring-loaded locking pin.

The sizing, configuration and control of the stabilizer/elevator and fins/rudders may be readily established by decades-old design criteria that are well known to those skilled in the art, and need not be set forth herein.

Figure 7:
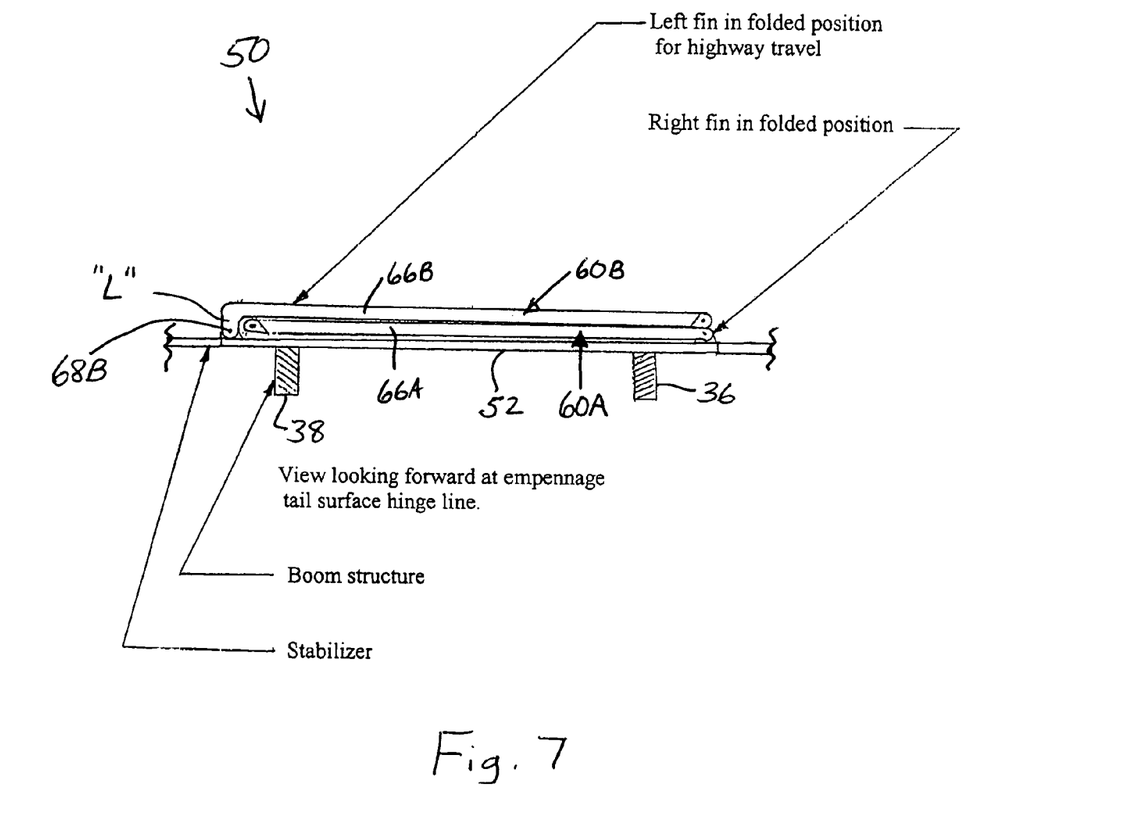
FIGS. 7, 8 and 9 are views of another foldable tail assembly, similar to the views of FIGS. 4, 5 and 6, but showing an alternative hinge structure for one of the fins.
Figure 8:
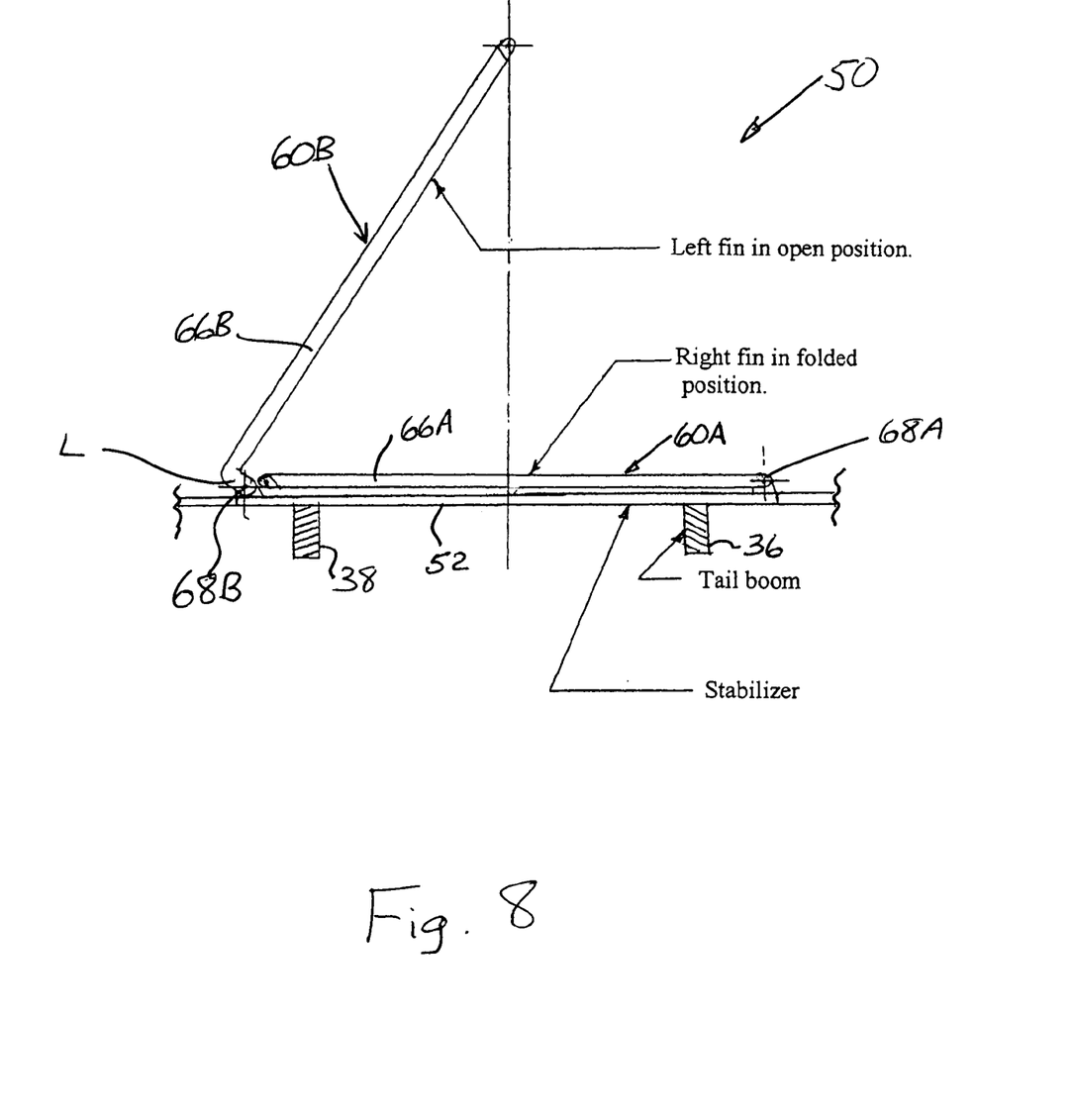
Figure 9:
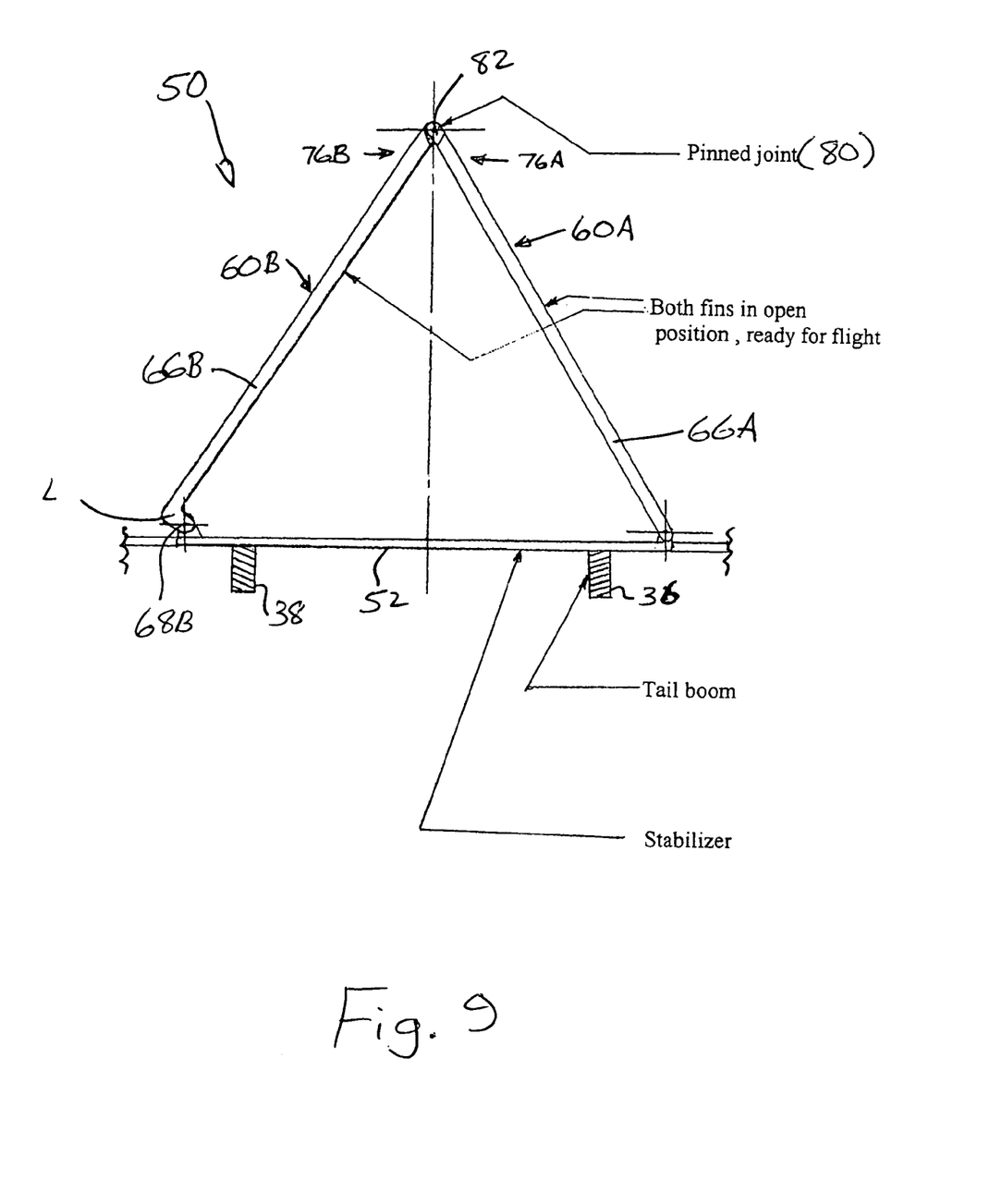

FIGS. 7, 8 and 9 illustrate an alternative structure for hinging the left fin 66B so that it may lie flat over right fin 66A. In this embodiment, the hinged end of left fin 66B includes an L-shaped offset "L" above its hinge 68B to accommodate the thickness of the fin it overlays. This, and other alternative hinging structures, may be employed.

While the drawings show fins of equal length that create an isosceles triangle when erected, it will be appreciated that the fins may have different lengths in order to reduce slipstream effects, or to offset propellor torque in flight. Also, while a right-handed configuration is shown, a left-handed configuration may be employed for the mechanical, or folding, sequence.

It will be appreciated that the term "triangle" or "triangular configuration", when used in conjunction with the tail assemblies of the invention, refers to the triangle formed by a portion of the horizontal stabilizer 52 and the two fin/rudder assemblies 60A, 60B when erected for flight (FIGS. 3 and 6). The stabilizer and fins so forming the "triangle" or "triangular configuration" typically are joined in a conventional hinged manner to the elevator and left/right rudders as described above. Operation of the elevators and rudders are by conventional stick and rudder controls well known in the art.

It will be appreciated that the tail assembly of the present invention provides an easy to erect and exceedingly lightweight structure. For example, if the foldable fins are erected to vertical orientation and unjoined at their tops, the fin roots would need to be able to carry moments due to airloads. This would add significantly to the structural weight of the tail assembly, and would require considerably more precision in the joints.

It will also be appreciated that the joined tops of the fins of the invention may have some aerodynamic interference, but unjoined fins (e.g., vertical fins) would have tip losses, so that the effects are a trade off.

While the present invention has been described in connection with certain illustrated embodiments, it will be appreciated that modifications may be made without departing from the true spirit and scope of the invention.

What is claimed is:

1. A foldable tail assembly for an aircraft comprising:
   a stabilizer;
   a pair of right and left fins mounted with respect to the stabilizer so that the fins lay flat over the stabilizer during periods when the aircraft is not flight-ready, and so that the fins are erected above the stabilizer to form a triangular configuration when the aircraft is ready to fly; and the ends of the fins that are remote from where the fins are mounted with respect to the stabilizer including a cooperative joint structure for joining together the ends when the fins are erected to the ready-to-fly orientation.

2. The foldable tail assembly of claim 1 wherein the aircraft has wings that are selectively positionable in either a retracted position when the aircraft is not flight-ready or an extended position when the aircraft is ready to fly, and wherein the foldable tail assembly is positionable in either its lay-flat or erected position to correspond to the flight-ready positioning of the wings.

3. The foldable tail assembly of claim 2 wherein the foldable tail assembly may be moved manually between its lay-flat and erect positions.

4. The foldable tail assembly of claim 2 wherein the foldable tail assembly may be automatically moved between its lay-flat and erect positions.

5. The foldable tail assembly of claim 4 including a mechanism providing automatic movement of the foldable tail assembly between its lay-flat and erect positions, said mechanism comprising rotary actuators at the fin roots and a remote actuated pin at the ends of the fins.

6. The foldable tail assembly of claim 1 wherein the stabilizer is substantially horizontally oriented and the left and right fins are hingedly mounted to the stabilizer.

7. The foldable tail assembly of claim 6 wherein the fins when erected form a triangle having the portion of the stabilizer between the fin-mounting hinges as the base of the triangle, and the fins as the sides of the triangle.

8. The foldable tail assembly of claim 7 wherein the triangle is an isosceles triangle, with the fins serving as the equal sides of the isosceles triangle.

9. The foldable tail assembly of claim 7 wherein the cooperative joint structure for joining together the remote ends of the fins comprises a quick-connect pin or bolt.

10. The foldable tail assembly of claim 6 wherein the stabilizer is supported by a boom structure.

11. The foldable tail assembly of claim 6 including an elevator hingedly connected to the stabilizer and a rudder hingedly connected to each fin.

12. The foldable tail assembly of claim 1 including an elevator hingedly connected to the stabilizer and a rudder hingedly connected to each fin.

13. The foldable tail assembly of claim 2 wherein the aircraft has flexible folding wings.

14. The foldable tail assembly of claim 2 wherein the aircraft has rigid wings.

15. A foldable tail assembly for an aircraft comprising:
a horizontal stabilizer;
a pair of right and left fins hingedly mounted to the stabilizer so that the fins lay flat over the stabilizer during periods when the aircraft is not flight-ready, and so that the fins are erected above the stabilizer to form a triangular configuration when the aircraft is ready to fly;
the ends of the fins that are remote from where the fins are hingedly mounted to the stabilizer including a cooperative joint structure for joining together the ends when the fins are erected to the ready-to-fly orientation, whereby the fins when erected form a triangle having the portion of the stabilizer between the fin-mounting hinges as the base of the triangle and the fins as the sides of the triangle;
an elevator hingedly connected to the stabilizer; and
a rudder hingedly connected to each fin.

16. The foldable tail assembly of claim 15 wherein the aircraft has wings that are selectively positionable in either a retracted position when the aircraft is not flight-ready or an extended position when the aircraft is ready to fly, and wherein the foldable tail assembly is positionable in either its lay-flat or erected position to correspond to the flight-ready positioning of the wings.

17. An aircraft comprising a fuselage, wings, a tail support structure, and a tail assembly, said aircraft comprising:
a stabilizer supported by said tail support structure;
a pair of right and left fins mounted with respect to the stabilizer so that the fins lay flat over the stabilizer during periods when the aircraft is not flight-ready, and so that the fins are erected above the stabilizer to form a triangular configuration when the aircraft is ready to fly; and
the ends of the fins that are remote from where the fins are mounted with respect to the stabilizer including a cooperative joint structure for joining together the ends when the fins are erected to the ready-to-fly orientation.

18. The aircraft of claim 17 wherein the wings are selectively positionable in either a retracted position when the aircraft is not flight-ready or an extended position when the aircraft is ready to fly, and wherein the foldable tail assembly is positionable in either its lay-flat or erected position to correspond to the flight-ready positioning of the wings.

* * * * *